Figure 1:
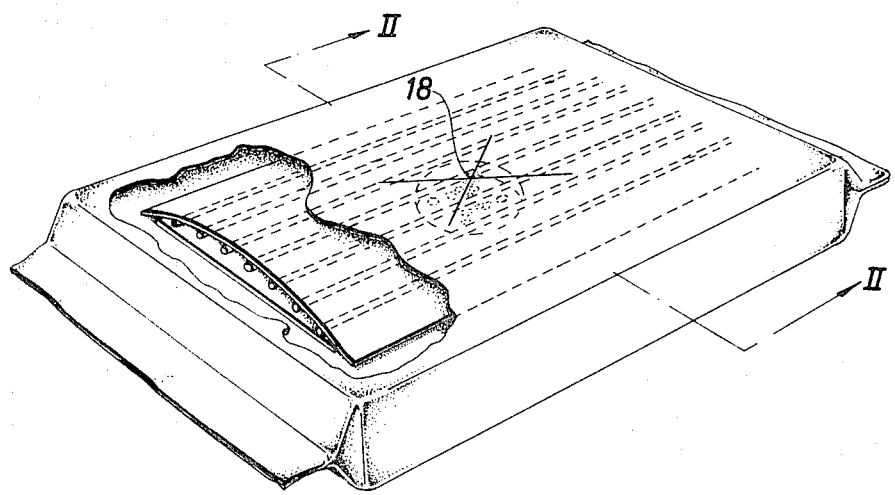

United States Patent
Ingerstedt et al.

[11] 3,733,745
[45] May 22, 1973

[54] GERMINATION AND SEEDLING PROMOTING UNIT

[75] Inventors: Sven Ingerstedt, Asbro; Max Paabo, Norrkoping, both of Sweden

[73] Assignee: Hasselfors Bruks Aktiebolag, Skyllber, Sweden

[22] Filed: Mar. 30, 1971

[21] Appl. No.: 129,552

[30] Foreign Application Priority Data

Apr. 1, 1970 Sweden .............................. 4463/70
Apr. 1, 1970 Sweden .............................. 4464/70

[52] U.S. Cl. .......................................... 47/37, 47/56
[51] Int. Cl. ................................................ A01c 1/04
[58] Field of Search .............. 47/37, 56, 34, 38-38.1

[56] References Cited

UNITED STATES PATENTS

| 3,273,284 | 9/1966 | Anagnostou | 47/34 |
| 2,309,702 | 2/1943 | Kirschenbaum | 47/56 |
| 2,785,969 | 3/1957 | Clawson | 47/37 UX |
| 3,172,234 | 3/1965 | Eavis | 47/56 X |
| 3,257,754 | 6/1966 | Ohsol | 47/56 |
| 3,362,106 | 1/1968 | Goldring | 47/56 |
| 3,456,386 | 7/1969 | Holden | 47/56 |
| 3,524,279 | 8/1970 | Adams | 47/37 X |

Primary Examiner—Robert E. Bagwill
Attorney—W. G. Fasse

[57] ABSTRACT

The present germination and seedling promoting unit includes an envelope containing a piece of preferably compressed moisture absorbing material such as peat for holding the seed or seeds. The bottom side of the envelope is provided with holes for absorbing ground moisture. The top surface of the envelope is provided with passage means for the growing seedling. Between the passage means and the seed or seeds there are provided mechanical protection means as well as evaporation protection means which are preferably formed as a web on a piece of tape, portions of which are taped to the peat to locate the protection means between the seed and the passage means.

10 Claims, 2 Drawing Figures

PATENTED MAY 22 1973         3,733,745

SVEN INGERSTEDT
MAX PÄÄBO

BY *W. G. Fasse*
        Atty.

GERMINATION AND SEEDLING PROMOTING UNIT

BACKGROUND OF THE INVENTION:

The method of reforestation by raising seedlings in forest nurseries and then replanting such seedlings or plants by means of different kinds of hand tools has been used for a long time in forestry. This method is biologically satisfying but very expensive. Owing to the increased mechanization of the lumbering and general forest work and due to the subsequent reductions of staff it has become more and more difficult during the last few years to get labor for manually planting. Further, the heavy character of the work is also a factor making it difficult to get the necessary labor.

It has also been suggested to sow forest seeds by hand. This method gives biologically acceptable results but the financial and staff situation is substantially the same as with regard to manual planting. A special and expensive weeding of the seedling stands is required and the seeds or young plants are somewhat sensitive to freezing.

Mechanical forest sowing has also been tried. This method is, however, biologically unsatisfactory depending on the weather prevailing during the sowing time and depending on the fact that the seed is not put into the soil. This method is advantageous inasmuch as it only requires a minimum of manual work during the sowing, but a special and expensive weeding in the seedling stands is required. Further, the consumption of seeds is rather large, which is essential as the price of forest seeds is fairly high. There are also certain problems with the selection of the provenance of the seeds.

Further, certain efforts have been made in order to realize a mechanical planting. Such methods, however, have been found to be very difficult to carry out especially where the land to be reforested is hilly and stony. On the other hand, potted plants, the use of which has also been tried, are very expensive. Besides, potted plants constitute a living, often growing planting stock which needs a continuous water supply and the large volume and weight of which is to be transported from the forest nurseries to the reforestation sites. The sensitivity of the planting stock is great.

OBJECTS OF THE INVENTION

The aim of the present invention is to eliminate the limitations and deficiencies of the methods indicated.

More specifically, the invention provides a germination and seedling promoting unit which is especially adapted to reforestation purposes.

SUMMARY OF THE INVENTION

According to the invention there is provided a germination and seedling promoting unit, especially for forest cultivation, wherein a moisture absorbing mass such as peat holds one or more seeds adjacent to a first surface of the mass, which is enclosed in an evaporation proof envelope provided with openings adjacent to a second surface of the mass for absorption of ground water by the mass through the openings. A seedling passage aperture is provided in the envelope adjacent to the first surface of the mass. Evaporation protection means such as a layer of foam material is locaTed between the seed or seeds and the seedling passage aperture in the envelope. Further, mechanical protection means such as parallel iron wires are located between the seedling passage aperture and the seeds.

BRIEF FIGURE DESCRIPTION

Figure 2:
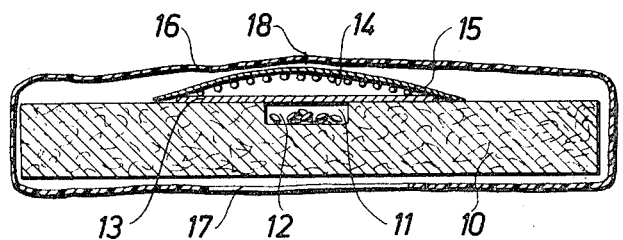

In order that the invention may be clearly understood, it will now be described, by way of example, with reference to the accompanying drawings, wherein:

FIG. 1 is a perspective view of the seedling promoting unit according to the invention; and FIG. 2 is a sectional view through the unit along line II—II of FIG. 1.

DESCRIPTION OF AN EXAMPLE EMBODIMENT

The present unit includes a package containing a moisture absorbing mass 10, preferably peat, fiber material or some other suitable material having the characteristics mentioned more in detail below. The mass 10, in this case in the form of a highly compressed peat plate carries the required number of seeds 12 in a cavity 11 which is covered on top at least partly by an evaporation protection means 13. The evaporation protection means in turn is covered by mechanical protection means 14, e.g. a plurality of iron wires extending in parallel to each other for preventing forest mice, voles, birds and the like from eating the seeds. The evaporation protection means 13 and the mechanical protection means 14 can be attached to the plate-shaped mass 10 by means of a layer 15 for example made of paper, which has one or more holes or slots above the seeds 12. The paper strip 15 can be a common tape strip provided with holes or slots.

The components in the unit mentioned are included in a covering 16 for example made of plastics. This covering is closed all around except for at least one opening 17 in the bottom and a cross cut 18 or the like in its top surface through which the plant may emerge from the package.

As mentioned above the mass 10 is preferably compressed peat which may be manured. Further, the mass may contain long-time acting nitrogen, humus-decomposing bacteria, elements suitable for the germination, substances establishing an advantageous plant bed as well as mycelia which prevent or are antagonistic to different noxious fungi the mass 10 may also be prepared with admixtures. It is appropriate to treat the seeds 12, which can be selected especially from case to case with respect to provenance etc., with repelling means against fungi, birds, rodents and the like. However, the last two treatments are of secondary importance, as the unit according to the invention is preferably provided with a mechanical protection, in this case the iron wires 14, against attacks of birds, forest mice and the like.

The upper side of the covering 16 should be designed so as to ensure the best heat-absorbing conditions. In northern countries the upper side should be dark-colored, e.g. black; whereby a temperature of up to 5°C higher than the temperature of the ambient ground may be reached in the unit. It is also possible to provide the covering material with serrations or the like to improve the heat absorption. In southern countries, where it may be necessary to prevent heat absorption, It may at least in certain cases be desirable to make the upper side of the covering 16 white.

The number of seeds per unit may vary. In certain cases only one seed per unit may be sufficient while in other cases it may be necessary to insert into each unit two or more, e.g. five seeds. It appears that the natural selection is strong enough so that sorting becomes unnecessary. This seems especially to apply to the types of trees requiring much light.

The covering 16 will naturally serve as a primary evaporation protection. After the seedling starts growing, or possibly already when the mass 10 has absorbed a certain quantity of moisture and, thus has swollen considerably, there is some evaporation through the opening 18 of the covering from the mass 10 closest to the seed or the seeds. For this reason the unit should be provided with the evaporation protection 13, which appropriately may be made of a very fine-porous foam plastics. A foam plastics layer of about 0.3–5.0 mm thickness through which slots extend and which are spaced from each other by about 0.3–5.0 mm for the plants to pass through, is appropriate. The slot spacing depends to some extent on the thickness of the foam plastics layer and also on the kind of seed used. The foam plastics layer with its slots shall be adapted so as to give the best protection against evaporation without simultaneously preventing the plants from emerging from the package.

The mechanical protection against attacks on the seeds can have a plurality of shapes. However, it has been found that a plurality of parallel running thin iron wires or some other oxidating material are quite appropriate. These wires, which may be spaced from each other by about 0.5–5.0 mm and which may be attached to the ends give a good protection against attacks of rodents, birds and the like while nevertheless providing space between them for the seedlings. The wires will in no way damage the plants because they rust away within a reasonable time.

During the manufacturing procedure the iron wires 14 are attached to a foam plastics strip which also serves as an evaporation protection and which is provided with groups of slots equally spaced relative to each other. The tape strip 15 is also provided with holes equally spaced relative to a coherent web, which is then cut into pieces, which are applied to separate, preferably plate-shaped seed-carriers of compressed peat. Thus, the position of the iron wires in relation to one another and also to the peat plate is fixed.

As the seeds so to speak are mechanically encapsulated in the unit good stocking and transportation conditions are achieved for the seeds which conditions are important to the development of the seeds and whereby the seeds can be stocked for a very long time and their transportation will not cause any substantial damages.

The transportation costs of the units according to the invention are extraordinarily low. The weight of a unit having, for example a size of 100 × 100 mm is only about 50 grams and the volume is also small because almost all water disappears when the peat is compressed.

A plurality of these unit s may be placed together in main packages which may be protected against moisture for instance by impregnation or by wrapping the main packages in a hermetically tight, welded plastic foil.

The distribution of the units can, therefore, take place at any time of the year and in many varying ways. The distribution by truck from a factory or a store takes place when the roads are in good condition, and in the winter the packages may be transported by snow mobiles. The units may be placed with advantage on the snow, but placing or "planting" the units soon after the melting of the snow is most appropriate for making use of the spring sap. The units may be planted by hand but with advantage they may also be placed by means of a special, mechanical ejector which can be mounted to a tractor.

As an alternative to placing the units on the snow they may with advantage be placed in previously prepared cavities or on the humus layer, in which case the mass 10 should contain humus transforming bacteria or herbicides.

The unit is placed with the uncovered side with the holes 17 facing downwardly, whereby it takes up ground water which is absorbed and prevented from evaporation, so that germination, and growth of the seedling take place under the most favorable circumstances.

We claim:

1. A germination and seedling promoting unit, especially for forest cultivation, comprising a moisture absorbing mass, one or more seeds in said mass adjacent to a first surface of the mass, an evaporation proof envelope substantially enclosing said mass, opening means in said envelope adjacent to a second surface of said mass for absorption of ground water by said mass through said opening means, seedling passage aperture means in said envelope adjacent to said first surface of the mass, evaporation protection means located between said seed or seeds and said seedling passage aperture means, and mechanical protection means for said seed or seeds located between said seedling passage aperture means and said seed or seeds, said mechanical protection means comprising a plurality of gradually decomposable wires and means for holding said gradually decomposable wires and the evaporation protection means in place against the moisture absorbing mass and over the seed or seeds, said means for holding including a layer of paper provided with holes for the seedlings, said paper layer overlapping the evaporation protection means and said mass.

2. The unit according to claim 1, wherein said gradually decomposable wires are made of iron.

3. The unit according to claim 1, wherein said evaporation proof envelope is made of plastic material.

4. The unit according to claim 1, wherein said evaporation protection means comprise a layer of foam plastic material.

5. The unit according to claim 4, wherein said layer of foam plastic material covers a large area of said mass and has a plurality of slots through which seedlings may pass.

6. The unit according to claim 1, wherein the gradually decomposable wires of the mechanical protection means, the evaporation protection means, and the overlapping layer form a coherent web which is attached to the mass.

7. The unit according to claim 1, wherein said overlapping layer is a tape facing with its tacky surface said mass and said evaporation protection means.

8. The unit according to claim 1, wherein said envelope has an upper side adapted for absorbing radiation heat.

9. The unit according to claim 1, wherein said mass is compressed peat.

10. The unit according to claim 1, wherein said overlapping layer is a tape, said wires being tacked to said tape which has a curved shape to face with its concave portion said evaporation protection means and said mass.

* * * * *